United States Patent [19]
Duffy et al.

[11] 4,161,211
[45] Jul. 17, 1979

[54] METHODS OF AND APPARATUS FOR ENERGY STORAGE AND UTILIZATION

[75] Inventors: Thomas E. Duffy; David A. Rohy, both of San Diego, Calif.

[73] Assignee: International Harvester Company, Chicago, Ill.

[21] Appl. No.: 753,821

[22] Filed: Dec. 23, 1976

Related U.S. Application Data

[63] Continuation-in-part of Ser. No. 591,831, Jun. 30, 1975.

[51] Int. Cl.² .................................... F28D 15/00
[52] U.S. Cl. .................................... 165/1; 62/4; 62/48; 126/263; 165/107 R; 165/DIG. 17
[58] Field of Search ............... 62/48, 4, 114; 423/248; 165/1, 107, DIG. 17

[56] References Cited

U.S. PATENT DOCUMENTS

| | | | |
|---|---|---|---|
| 2,798,806 | 7/1957 | Jaffee et al. | 75/175.5 |
| 3,075,361 | 1/1963 | Lindberg | 62/4 |
| 3,479,165 | 11/1969 | Lyon | 423/647 X |
| 3,753,700 | 8/1973 | Harrison et al. | 75/175.5 |
| 4,044,819 | 8/1977 | Cottingham | 165/1 |

*Primary Examiner*—Leland A. Sebastian
*Attorney, Agent, or Firm*—Strauch, Nolan, Neale, Nies & Kurz

[57] ABSTRACT

Methods of and apparatus for providing refrigeration, heating and air conditioning which use metallic hydrides for thermal energy storage and upgrading.

20 Claims, 6 Drawing Figures

METHODS OF AND APPARATUS FOR ENERGY STORAGE AND UTILIZATION

This application is a continuation-in-part of application Ser. No. 591,831 filed June 30, 1975.

The present invention relates to the storage and subsequent recovery and use of thermal energy, typically in applications involving heating or air conditioning or both.

The rising demand for energy and the diminishing supply of high grade fossil fuels has given rise to a number of major efforts designed to make alternate energy sources feasible and to more efficiently utilize the energy available from high grade sources of primary energy.

Solar energy, for example, is available in unlimited quantities. Thermal energy is also available from other sources in quantities which are definitely worth considering. These include geothermal, and waste heat from industrial processes and heat engines such as internal combustion, steam and gas turbines and others.

Such energy sources have their drawbacks. The energy is typically low grade, and it may not be available when the demand arises.

Much of the available high grade energy is not efficiently utilized. Power plants, for example, are typically over designed to make it possible to meet peak loads. The result is that such plants function with significantly lower efficiency during off-peak periods.

One important and primary object of the present invention resides in the provision of novel, improved methods and apparatus for utilizing energy and, more particularly, in the provision of such methods and apparatus which are capable of efficiently utilizing low grade energy while retaining the capacity for utilizing high grade thermal energy.

Another important and primary object of our invention resides in the provision of novel, improved methods and apparatus for storing energy and making it available upon demand for heating or cooling or both heating and cooling.

We accomplish the foregoing goals and obtain additional important benefits with systems in which hydridable intermetallic compounds or alloys are utilized as energy storage media.

A typical system in accord with the principles of the present invention includes an input-output tank and a storage tank both containing beds of hydridable metals.

In the storage cycle waste, geothermal, solar, or other low grade thermal energy or high grade thermal energy (from off-peak electrical energy, for example) is supplied to the input-outout tank where the metallic material is in hydrided form. This disassociates the hydrides, releasing hydrogen which flows to the storage tank and combines with the metallic material housed in it, providing a source of recoverable thermal energy.

To recover the energy heat, typically at ambient temperature, is supplied to the storage tank, disassociating the hydrides therein and releasing hydrogen which flows back to the input-output tank.

Heat of formation is given up as the hydrides are formed in the input-output tank because the hydriding reactions are exothermic. This heat can be recovered along with sensible heat in the hydrogen gas and used for space heating or other purposes.

The energy can be stored indefinitely in the hydride form. Consequently, the energy can be stored when available and recovered and utilized later when a demand arises. Or, if the application dictates, heat and/or cooling can be made continuously available for as long as thermal energy is supplied to the system.

Heat must be supplied to the storage tank during the energy recovery cycle because the dehydriding reactions are endothermic. This is typically done by circulating a heat transfer fluid such as water through the tank.

Because heat is given up by the fluid conveying thermal energy to the storage tank, that fluid exits at a low temperature. The fluid can accordingly be used directly or indirectly as a cooling medium for air conditioning or other purposes.

Furthermore, by transferring heat of association and sensible heat in the hydrogen to one heat exhange fluid in the input-output tank and absorbing heat from that fluid supplied to the storage tank, heating and cooling mediums can be furnished simultaneously.

That energy can be stored in our novel systems when available and subsequently recovered when a demand for heat or cooling arises is yet another important feature which distinguishes our invention from conventional heating and cooling systems. This permits our systems to be more closely matched to the average demand on them, reducing capital and operating costs and maximizing energy utilization.

The energy which is stored may be that generated by a conventional power plant during periods when demand exceeds base load. In this case our novel system not only provides the advantages discussed above but, also, increases overall efficiency of the power plant, thereby reducing operating costs and conserving energy.

Another advantage of our invention is that, as discussed above, the same simple system is capable of supplying both heating and cooling without any elaborate or time consuming changeover from one mode of operation to another. This is particularly advantageous in space heating applications where demands for both heat and air conditioning may exist in the same day during the spring and fall for example, or in different parts of the same structure.

Safety is another advantage of our novel systems. Hydrogen has a wide range of explosive mixtures (4–75 percent). Serious ruptures in conventional systems containing hydrogen are as a consequence potentially extremely hazardous. However, a comparable rupture in our systems will result in only small quantities of hydrogen being released as heat must be supplied to free the hydrogen from the hydride; and decomposition of the hydride actually causes cooling unless external heat is supplied.

Another important advantage of our novel energy storage and utilization systems, suggested above, is that they can be operated on and are capable of upgrading the energy available from low grade (approximately 60° C.) sources such as solar and geothermal.

Another important source of energy for our systems, heretofore generally unrecoverable as a practical matter, is waste heat. This typically low grade thermal energy is available in vast quantities from industrial processes and engines and from other sources. Conventional heat engines, for example, reject 60–70 percent of the energy supplied to them in the form of low grade thermal energy. Industrial processes in general produce comparable amounts of low grade thermal energy.

An important feature of our systems in applications involving waste heat recovery is their versatility. Recoverable waste heat will typically range in temperature from 93°–530° C. The compositions of the hydridable metallic materials used as storage media in our systems can be readily tailored to efficiently use the energy in this entire temperature range depending upon the temperature at which it is available. The result is overall energy utilization efficiencies of up to 80 percent on a practical basis.

Energy stored by our systems can be utilized in a variety of ways. It can be employed for space heating and cooling, to supply heat to and remove heat from industrial processes, and for many other purposes which will be readily apparent to those skilled in the arts to which our invention pertains.

Another application where the principles of our invention can be used to particular advantage is in the air conditioning of vehicles. The typical automobile air conditioner requires from three to 14 horsepower during normal operation depending upon the cooling demand. Consequently, a significant part of the energy consumed goes simply to operate the air conditioner. Furthermore, as engine size and power are reduced to increase fuel economy, the power drained off by the air conditioner can reach a level where both fuel economy and performance are seriously affected.

These problems can be avoided by employing an air conditioning unit in accord with the principles of the present invention. Waste heat from the exhaust or cooling system is used to operate the air conditioner. Consequently, no mechanical energy is drained from the automobile engine; and, in comparison with an automobile equipped with a conventional air conditioner, a 10 to 20 percent reduction in fuel consumption can be obtained during periods when the air conditioner is operating.

At the same time our novel vehicular air conditioners are simple as they have no compressor or moving parts except for a fan and relatively light (on the order of 100 pounds). The cost is no higher than that of a conventional vehicle air conditioner.

Also, air conditioning is immediately available upon demand, and the same system that is used for air conditioning can be employed to heat the vehicle engine before starting it in cold weather.

At the present time sensible heat systems are the only ones used to any extent to utilize energy from alternate energy sources. In a typical system of this character water is used as a heat transfer medium. Heat is transferred to the water from an existent energy source, and the water is then pumped to a locale where a demand for heat exists. Here the heat is given up by radiation or to air for example.

At the present time the most publicized sensible heat systems making use of alternative energy sources are solar heating systems. These are inferior to the novel systems we have invented because the volume of the system is 7.5 or more times greater than systems constructed in accord with the principles of the present invention and operated on solar energy.

Even at that there is no provision for storage of thermal energy. If this capability is added as by the use of the conventional rocks or bricks, the volume of the sensible heat system is increased at least five fold, making the volume of the system several orders of magnitude greater than a system embodying the principles of the present invention.

In applications of sensible heat systems involving high temperature energy sources, pressure also becomes a problem. For example, to keep water from vaporizing at only 260° C. a pressure of 45 atmospheres (660+ psi) must be maintained on it. This requires bulky, heavy, and correspondingly expensive system components. Consequently, even where cost is not a primary factor, alternate energy source operated, sensible heat systems are often not practical in applications where space is at a premium such as in commercial buildings, ships, offshore platforms, and certain residential designs.

Pressures in our novel systems, in contrast, can readily be limited to three-four atmospheres. System components capable of withstanding these modest pressures are relatively low in cost, bulk, and weight.

Systems taking advantage of the latent heat of vaporization of water and other liquids are of course also available. In many cases, however, such systems are entirely impractical because of large volume changes, high pressures, and other problems appurtenant to the change in phase. Consequently, latent heat of vaporization systems have made little impact in particular in the recovery of thermal energy from alternote energy sources and in applications where cost and bulk are limiting factors.

In view of the obvious disadvantages of sensible heat and latent heat of vaporization systems, considerable attention has recently been given to the use of fusible materials such as sodium thiosulfate pentahydrate to store thermal energy in a form which makes recovery of the energy practical. In these systems heat of fusion given up as the material solidifies in a recovery step is retrieved and used for space or other heating purposes.

While superior to sensible heat storage systems, those utilizing latent heat of fusion are nevertheless capable of storing only about 10–80 percent as much energy as a typical system in accord with the principles of the present invention.

Also, there are no phase changes in the operation of our novel systems as there are in those using fusion materials. Consequently, the shrinkage, expansion, void formation, and non-uniform melting and solidifying associated with fusion materials and the extensive heat transfer problems they cause are eliminated. This is particularly important in applications involving a high temperature energy source as thermal strain induced fatigue and overstress then become so acute in fusion material systems that structural failures are common.

Furthermore, systems in accord with the principles of the present invention are simpler than those employing fusion materials, and they are substantially more versatile. The temperatures at which energy can be stored and recovered may be varied simply by changing the pressure level in the system. There is no corresponding capability in fusion material systems. At the same time our novel systems retain the important advantage common to fusion material systems that energy can be stored and subsequently recovered at nearly constant temperatures, minimizing heat exchanger bulk and power requirements.

Systems for storing and utilizing thermal energy which make use of hydridable metals as storage media have heretofore been proposed in U.S. Pat. Nos. 3,075,361 issued Jan. 29, 1963, to Lindberg for METHODS AND APPARATUS FOR TRANSFERRING HEAT; 3,504,594 issued Apr. 7, 1970, to Winsche for INTERMITTENT POWER SOURCE; and 3,943,719 issued Mar. 16, 1976, to Terry et al for HYDRIDE-DEHYDRIDE POWER SYSTEMS AND METHODS. In no case, however, is the system comparable to those we have invented and disclosed herein.

The Terry et al system, for example, is capable of producing refrigeration only by expanding desorbed hydrogen through a gas turbine. This arrangement is more complex than ours and is otherwise impractical for the applications for which our invention is particularly intended because of the bulk, complexity, and other problems intoduced by the turbine and its ancillary equipment. Furthermore, there is no provision in the Terry et al system for making heat available for space heating or other purposes.

For the most part there is a mass transfer on both hydrides and metallic materials in the systems disclosed in Lindberg. This alternative is inferior to ours, which involves only a transfer of hydrogen gas, because of the cost of and problems associated with the mass transfer of solids and liquids.

The only Lindberg system which does not involve a mass transfer of solids or liquids (or both) is disclosed in only the sketchiest manner. While it is purportedly capable of making heat of association available, there is no disclosure of how this could be accomplished. Nor is there any suggestion that the system in question could be used to produce refrigeration of air conditioning.

The capability for producing refrigeration also distinguishes our invention from the steam generating system disclosed in Winsche. Furthermore, like Lindberg, Winsche is silent on how the heat generated by hydride disassociation in his system is actually recovered and made available to the boiler were it is used.

Two important and primary objects of our invention have been described above. It will be apparent to the reader that other and also important but more specific objects of our invention reside in the provision of methods and apparatus in accord with the foregoing primary objects:

(1) in which are capable of operating at low temperatures and pressures;

(2) which permit capacity to be more closely matched to demand than is currently practical;

(3) which are capable of storing energy generated by conventional power plants and subsequently making that energy available when a demand arises, thereby increasing the efficiency with which primary energy supplied to the power plant is utilized;

(4) which can be employed to upgrade the energy available from low grade sources of thermal energy;

(5) which have capabilities not possessed by heretofore proposed energy storage and utilization systems employing hydridable materials as energy storage media;

(6) which employ a minimum of strategic or exotic materials;

(7) which are essentially free of the drawbacks of sensible heat, latent heat of vaporization, and fusion material systems.

Still important but more specific objects of our invention reside in the provision of energy storage and utilization systems of the character described above:

(8) which are simple and have a minimum number of moving parts;

(9) which compare favorably to currently available alternatives in initial cost;

(10) which are relatively inexpensive to operate and maintain and which have a service life of acceptable duration;

(11) which are sufficiently compact and light to make them suitable in automotive and other applications where space and weight are at a premium.

Other novel features and additional objects and advantages of our invention will become apparent from the appended claims and as the ensuing detailed description and discussion proceeds in conjunction with the accompanying drawings, in which:

Figure 1A:
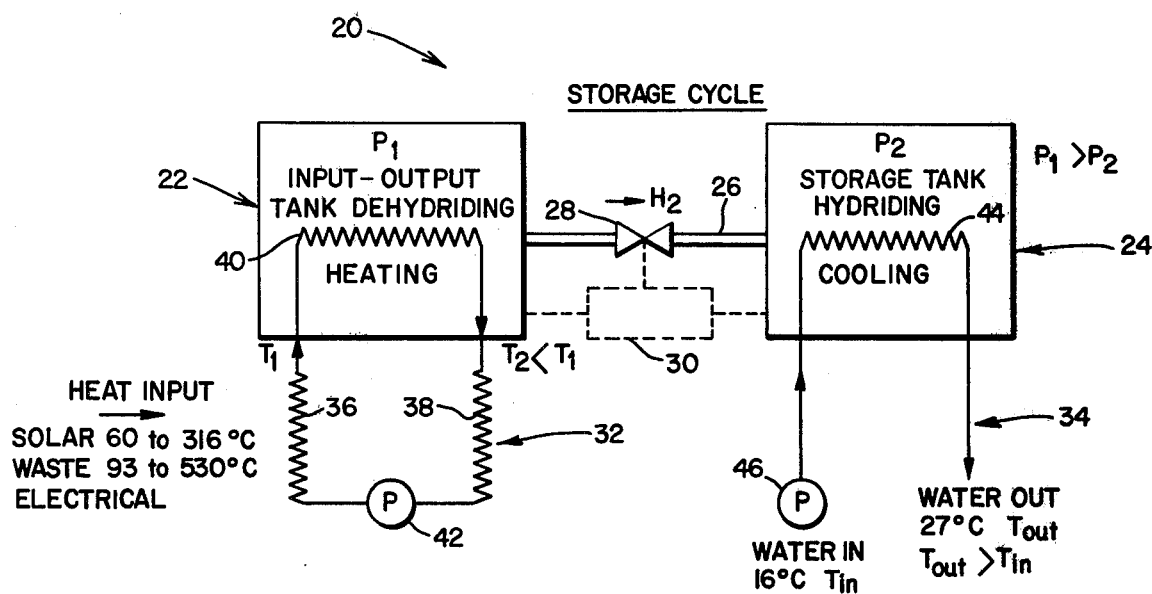
FIGS. 1A and 1B are generally schematic illustrations of the thermal energy storage and recovery cycles of one system embodying the principles of the present invention.
Figure 1B:
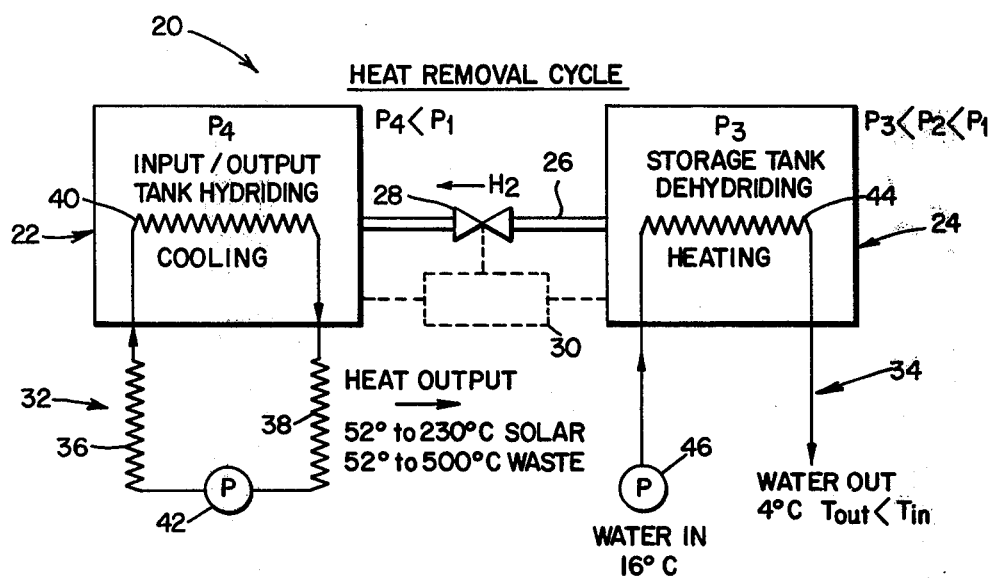

Referring now to the drawing, FIGS. 1A and 1B depict a thermal energy storage and utilization system 20 in accord with the principles of the present invention in its most elementary form.

Among the major components of system 20 are an input-output tank 22, a storage tank 24, a conduit 26 connecting the tanks, a valve 28 for controlling the flow of hydrogen through conduit 26, and a controller 30 of conventional construction for opening and closing valve 28.

System 20 also numbers among its major components two heat transfer fluids circulation systems 32 and 34.

System 32 includes external heat exchangers 36 and 38 and a third heat exchanger 40 located in input-output tank 22. The three heat exchangers are connected in series with a fluid circulator or pump 42.

Circulation system 34 includes a heat exchanger 44 located in storage tank 24 and a pump 46 for circulating a heat exchange fluid (typically water) through the heat exchanger.

Each of the two tanks 22 and 24 contains a hydridable intermetallic compound or alloy in finely divided, particulate form. Maximum efficiency can be obtained by matching the metallic material in each of the two tanks 22 and 24 to the reactions which take place and conditions in each of the tanks.

Intermetallic compounds or alloys which can be used to advantage in storage-cooling tank 24 are FeTi and transition metal modified, iron-titanium alloys containing, nominally, by atomic ratio: 0.1 to 0.9 atom of iron; 0.1 to 0.9 atom of a Group IV-B, V-B, VI-B, VII-B, or VIII transition metal or mixture of such metals; and one atom of titanium; i.e., compounds or alloys of the formula $Fe_{0.01-1.0}Ti_{1.0}N_{0-0.9}$ where N is a transition metal or mixture thereof as aforesaid. Representative of the transition metals which may be employed are: chromium, cobalt, manganese, nickel, niobium, and vanadium.

Intermetallic compounds or alloys of the character described in the preceding paragraph are known as is shown by, for example, HYDROGEN STORAGE AND PURIFICATION SYSTEMS II, BNL 19436, Brookhaven National Laboratories, Aug. 1, 1974.

Representative alloys of the foregoing character we can employ include:

$Fe_{0.5}V_{0.5}Ti$ $Fe_{0.5}Mn_{0.5}Ti$ $Fe_{0.9}Ni_{0.1}Ti$ $Fe_{0.5}Ni_{0.5}Ti$

Compatible and highly efficient intermetallic compounds or alloys which can be used in input-output tank 22 when the thermal energy is available at a temperature of 200° C. or higher are those of the nominal formula, by atomic ratio, $Mg_{0.8-0.9}Ni_{0-0.1}M_{0-0.1}$ where M is an element of periodic table groups I-B, III-A, or IV-A or a mixture thereof. Exemplary, usable elements from these groups include aluminum, silicon, copper, zinc, and gallium.

Representative of those compounds identified by the formula in the preceding paragraph that we can employ are:

$Mg_{0.9}Ni_{0.1}$
$Mg_{0.825}Ga_{0.025}Ni_{0.1}$
$Mg_{0.85}Zn_{0.05}Ni_{0.1}$
$Mg_{0.8875}Sn_{0.0125}Ni_{0.1}$
$Mg_{0.8}Zn_{0.1}Ni_{0.1}$
$Mg_{0.9}Ni_{0.1}$
$Mg_{0.875}Ga_{0.025}Ni_{0.1}$
$Mg_{0.9}Zn_{0.05}Ni_{0.05}$
$Mg_{0.825}Zn_{0.05}Ga_{0.025}Ni_{0.1}$
$Mg_{0.89}Si_{0.01}Ni_{0.1}$
$Mg_{0.85}Zn_{0.05}Ni_{0.1}$
$Mg_{0.9}Zn_{0.05}Cu_{0.05}$

Methods of preparing the magnesium-based alloys described above are disclosed in Rohy et al, Automotive Storage of Hydrogen Using Modified Magnesium Hydrides, TEC-75/002, United States Energy Research and Development Administration, July 1975.

By using an intermetallic compound of the formula $Fe_{0.1-0.9}N_{0.1-0.9}Ti_{1.0}$ as described above in input-output tank 22 rather than one of the above-discussed magnesium-based alloys, systems in accord with the principles of the present invention can be operated on thermal energy having temperatures as low as about 60° C.

Iron-titanium- and magnesium-based intermetallic compounds as described above absorb and desorb large quantities of hydrogen at temperatures in the range of room temperature to 530° C. and at pressures of 1 to 20 atmospheres. They are inexpensive, compact, non-pyrophoric and otherwise safe, and relatively light in weight.

Referring again to the drawing, FIG. 1A depicts the operation of the system 20 just described during the energy storage cycle.

At the beginning of this cycle the metallic material in input-output tank 22 is hydrided, and that in storage tank 24 exists in reduced, metallic form.

Solar, waste, off-peak electrical generated, or other energy is supplied to the hydride in tank 22 via external heat exchanger 36. Here the energy is transferred to heat exchange fluid pumped through circulation system 32 by pump 42. When it reaches heat exchanger 40, the energy is given up to the hydride. This decomposes the hydride, desorbing hydrogen which, with valve 28 open, flows through conduit 26 to storage tank 24 and combines with metallic hydride former in the tank.

As the hydriding reactions are exothermic, heat exchange fluid (typically water at ca. 16° C.) is circulated through coil 44 by pump 46 to absorb heat from tank 24 and keep the pressure in the tank from exceeding the maximum selected level. To keep equipment costs at the reasonable level, a maximum pressure of three to four atmospheres will typically be selected.

The storage of energy in tank 24 will continue as long as energy is supplied to tank 22 or until that tank has been depleted of hydrogen.

To recover and make available for use the energy thus stored (see FIG. 1B), valve 28 is again opened; and heat is supplied to storage tank 24 to decompose the hydrides now existent in that tank. As shown in FIG. 1B, this can be accomplished by circulating the same 16° C. water employed to remove heat of reaction during the storage cycle through heat exchanger 44.

The desorbed hydrogen flows in the reverse direction through conduit 26 to tank 22 where it combines with the hydridable metallic materials in that tank, again giving up heat because of the exothermic character of the hydriding reactions.

This heat together with sensible heat in the hydrogen flowing to tank 22 is transferred by heat exchanger 40 to fluid circulated through system 32 by pump 42. The heat can be recovered in a useful form as by circulating air, for example, across external heat exchanger 38.

The removal of heat from tank 22 during the heat recovery step not only makes that energy available for heating purposes but, also, keeps the temperature in tank 22 low enough that hydriding will continue as long as hydrogen flows to that tank from storage tank 24.

Because it gives up heat to the hydrides in tank 24 during the heat removal cycle, the fluid circulated through heat exchanger 44 by pump 46 exits from circulation system 34 at a temperature which may be only a few degrees centigrade. This fluid can, accordingly, be used for refrigeration, air conditioning, and other cooling purposes.

As no hydrogen is lost in the hydriding or desorbing cycles, all of the hydrogen displaced from tank 22 to tank 24 during the storage cycle can be returned to tank 22 in the heat recovery step. As a consequence, essentially all of the energy stored in tank 24 can be recovered from tank 22 in the heat removal cycle. A degradation in temperature does occur, but this is generally not consequential in the applications for which system 20 is intended.

Figure 2:
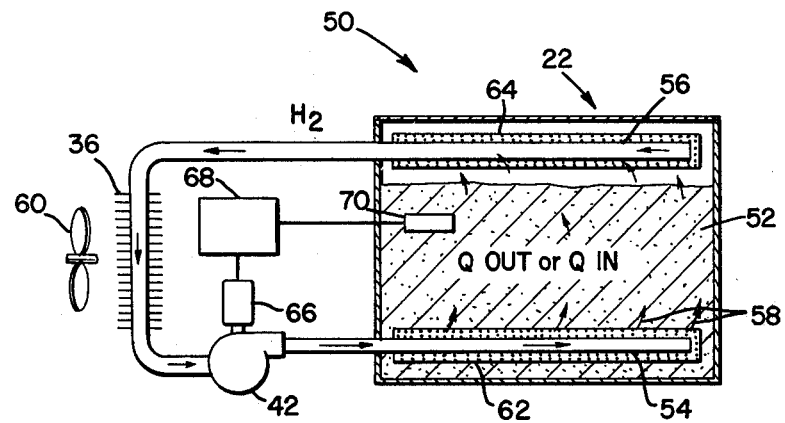
FIGS. 2–4 are schematic illustrations of other thermal energy storage and utilization systems in accord with the principles of the present invention.

Referring again to the drawing, FIG. 2 depicts a modified system 50 for supplying heat of disassociation to the hydrides in tank 22 in the energy storage cycle.

The hydrides are formed into a bed 52, and heat exchange system 50 includes one conduit 54 extending through the bottom part of the bed and a second conduit 56 spaced slightly above it. The heat exchange fluid (typically hydrogen) is pumped through conduit 54 by pump 42 to the bed. As shown by arrows 58, it flows through the bed, effecting a direct transfer of heat to the hydrides and producing a fast response time, and then into conduit 56. As it flows through this conduit back to circulator 42, it passes through heat exchanger 36 where the heat given up to the hydrides is replaced as by heated waste gases circulated across the heat exchanger by blower 60.

Sintered metal tubes (or porous screens) 62 and 64 keep the finely divided hydrides from entering flow conduits 54 and 56. That these may not operate with one hundred percent efficiency is not significant because the circulation system can readily be designed to prevent excessive silting, which allows small amounts of the hydrides to be continuously circulated through it.

The reaction conditions in tank 22 are kept uniform by varying the speed of circulator motor 66. This is accomplished by a conventional speed control 68 having a temperature responsive sensor 70 disposed in the hydride bed 52.

The circulation system 50 just described can also be employed to recover the energy generated by the exothermic reactions in tank 22 during the heat removal cycle. The only differences are that heat is transferred to rather than from the heat exchange fluid in tank 22;

and heat is transferred to rather than extracted from the air or other fluid circulated across heat exchanger 36 by blower 60.

Figure 3:
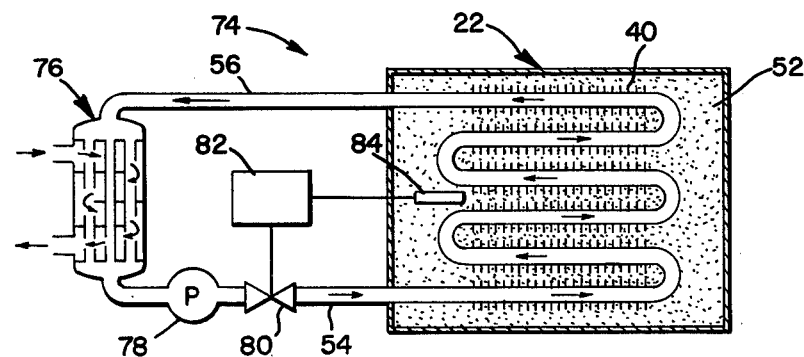

Another system for supplying heat to and recovering it from the hydrides in tank 22 is shown in FIG. 3 and identified by reference character 74. Like the circulation system 32 shown FIGS. 1A and 1B, that shown in FIG. 3 has a heat exchanger 40 surrounded by the hydrides in bed 52. Conduits 54 and 56 and an external heat exchanger 76, a pump 78, and a variable flow control valve 80 constitute a closed loop through which a heat transfer fluid can be circulated to effect a transfer of heat to or from bed 52. Depending upon the temperature involved, the heat exchange fluid in the loop maybe a water-antifreeze solution, high pressure water, a gas, or a high boiling point organic liquid.

In the storage cycle the thermal energy on which the system is operated is transferred to the fluid in system 74 by circulating a fluid containing the energy through one side of external heat exchanger 76 and circulating the heat exchange liquid through the other side by pump 78. The heated fluid then flows to internal heat exchanger 40 when the heat is given up to the hydrides in bed 52 to desorb the hydrogen.

In the heat recovery cycle the heat given up in the hydriding reactions is transferred to heat exchange fluid in heat exchanger 40. The fluid then flows through conduit 56 to external heat exchanger 76 where the heat is transferred to a fluid circulated through the heat exchanger in heat transfer relationship with the fluid circulated thereto through conduit 56.

Uniform reaction conditions are maintained in tank 22 during the storage and heat recovery cycles by regulating the flow of heat exchange fluid. This is accomplished by a conventional valve controller 82 having a temperature responsive sensor 84 embedded in the hydrides contained in tank 22.

Figure 4:
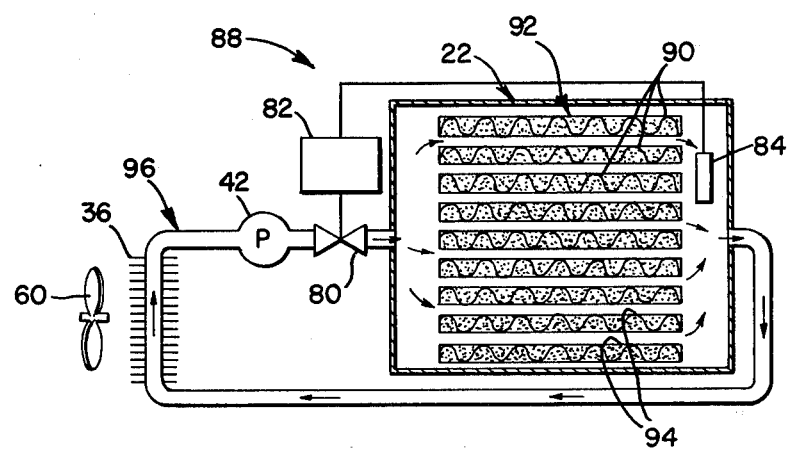

FIG. 4 depicts yet another system 88 for transferring thermal energy to the hydrides in tank 22 and for transferring heat generated by the hydriding reactions during the heat recovery cycle to a fluid circulating exteriorly of the tank. System 88 is particularly advantageous in applications where high operating pressures can be used to advantage.

In system 88 the hydrides are contained in tubes 90 assembled into a matrix 92 having flow passages 94 extending from end-to-end therethrough.

To permit hydrogen to flow from matrix 92 to storage tank 24 and back to tank 22, tubes 90 are connected by an appropriate manifold (not shown) of conventional construction to the hydrogen transfer conduit 26 connecting the two tanks.

The operation of system 88 is essentially the same as that of circulation system 74. System 88 has the same type of closed loop for the heat exchange fluid (identified by reference character 96), and heat is transferred from the source of operating energy to the liquid in that loop during the energy storage cycle. The heated fluid exiting from heat exchanger 36 is pumped into tank 22 and flows through passages 94 in matrix 92, giving up the heat to the hydrides in tubes 90. From passages 94 the fluid flows back to heat exchanger 36 where it is reheated.

Also, the operation during the heat removal cycle is essentially the same except that heat is transferred from the hydrides to the fluid in loop 96 and given up by the fluid in external heat exchanger 36.

Figure 5:
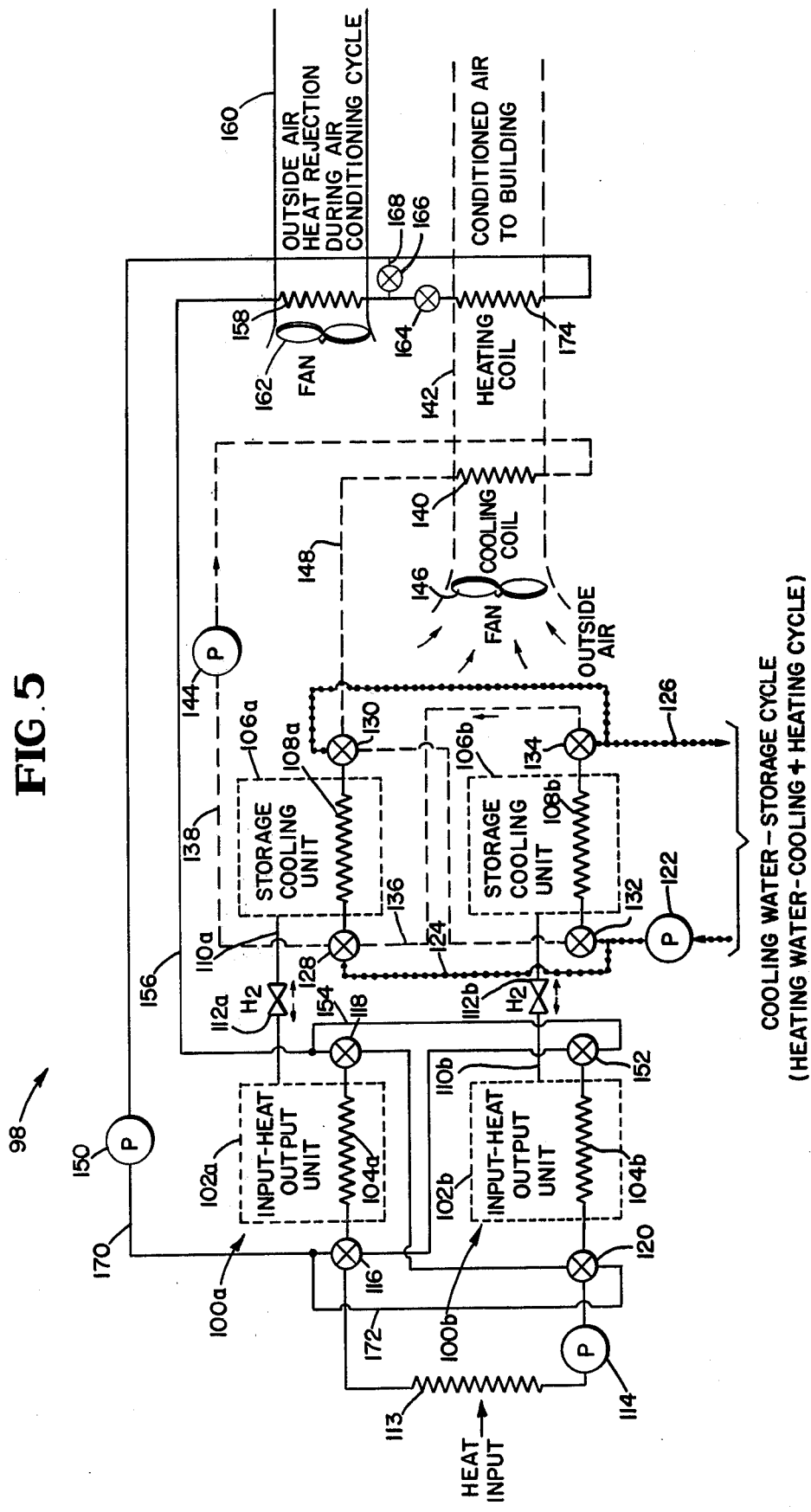
FIG. 5 is a schematic illustration of a space heating and air conditioning system in accord with the principles of the present invention.

FIG. 5 depicts, in generally schematic form, a conditioning system 98 designed specifically for space heating and cooling. This system is designed to supply heat or cooling continuously or upon demand and to both heat and cool different parts of the space it serves at the same time.

System 98 includes two essentially identical energy utilization systems 100a and 100b. The components of these two systems will be identified by the same reference characters followed by an appropriate letter when necessary to distinguish them.

The energy utilization systems 100a and 100b are essentially identical to the system 20 discussed above. Each includes an input-output tank 102 housing a bed of metal hydrides (not shown) and a heat exchanger 104, a storage-cooling tank 106 also housing a bed of hydrides (not shown) and a heat exchanger 108, a hydrogen transfer conduit 110 connecting the two tanks, and a valve 112 for controlling flow through the conduit. Duplicate systems are employed primarily so that the space served by system 98 can be continuously conditioned.

To store thermal energy in unit 106a, a heat transfer fluid such as described above is circulated through a closed loop consisting of internal and external heat exchangers 104a and 113 by pump 114. Valves 116, 118 and 120 are at the same time adjusted to complete this circuit and to isolate the heat exchanger 104b in input-output unit 102b.

Thermal energy transferred to the heat exchange fluid in external heat exchanger 113 is accordingly given up to the hydrided intermetallic compound in unit 102a via internal heat exchanger 104a, desorbing hydrogen. This hydrogen flows through transfer conduit 110a and valve 112a into storage unit 106a where it combines with dehydrided alloys in that unit.

To keep the temperature and pressure in unit 106a from exceeding selected levels, water or other heat exchange fluid is circulated by pump 122 during the storage cycle through conduit 124 to the internal heat exchanger 108a in unit 106a where reaction heat is absorbed. The heat exchange fluid is then discharged through conduit 126. Valves 128 and 130 direct the heat exchange medium through this path and divert it from storage unit 106b.

The second energy utilization system 100b can be employed to supply either heated or cooled air or both heated and cooled air to locales where a demand exists while energy is being stored in the storage unit 106a of system 100a.

If the demand is for cooling, valve 132 is adjusted to divert part of the fluid flowing to unit 106a through conduit 124 to the heat exchanger 108b in storage unit 106b. Here, the fluid gives up heat to the hydrides in the unit, desorbing hydrogen which flows to unit 102b. The heat transfer fluid flowing through the heat exchanger, now at reduced temperature, flows through valve 134, conduit 136, valve 128 (in actual practice typically a multi-valve unit), and conduit 138 to a heat exchange coil 140 located in a duct 142. Circulation is effected by a pump 144.

A blower 146 circulates air over coil 140 transferring heat from the air to the heat exchange medium in the heat exchanger. The cooled air then flows through duct 142 to the locale where the demand for cooling exists.

From heat exchanger 140, the heat exchange fluid flows through return conduit 148 and valve 130 into discharge conduit 126.

During the operation of system 98 in the air conditioning mode just described, heat must be removed from input-output unit 102b. This is accomplished by energizing pump 150 and adjusting valve 152 to divert part of the heat exchange fluid exiting from heat exchanger 104b through conduits 154 and 156 to a heat exchange coil 158 housed in a duct 160. A blower 162 circulates air over the heat exchange coil, transferring excess thermal energy to the air, which is rejected.

During this mode of operation, valve 164 in conduit 156 is closed, and valve 166 in branch conduit 168 is open. Accordingly, after exiting from heat exchange coil 158, the heat exchange fluid flows through conduit 168 and conduits 170 and 172 back to internal heat exchanger 104b in input-output unit 102b.

If heating rather than air conditioning is required, the system is operated as described above for air conditioning except that the heat exchange medium discharged from the internal heat exchanger 108b in storage unit 106b is diverted into discharge conduit 126 rather than being circulated to heat exchanger 140. Also, valve 164 is opened and valve 166 closed so that heated fluid discharged from heat exchanger 104b in input-output unit 102b can be circulated by pump 150 through conduits 154 and 156 to heat exchange coil 174 in duct 142. Consequently, the air circulated through the duct by blower 146 is heated rather than cooled before it flows to the locale where the demand exists.

If there is a demand for both heating and cooling, system 100b operates in the same manner as if there were only a demand for cooling. However, the air heated in duct 160 is supplied to the locale where the demand for heat exists to meet that demand rather than being rejected.

It is of course not necessary that system 100b be operated to supply heat and/or cooling at the same time that thermal energy is being stored in the storage unit 106a of system 100a. The operation of the two systems 100a and 100b is independent, and system 100b may accordingly be employed to supply heating or air conditioning irrespective of whether or not system 100a is being utilized.

It will also be apparent that, simply by adjusting the settings of the various valves or valve units described above, heating and/or cooling can be provided by system 100a in the manner just described in conjunction with system 100b. Inasmuch as the operation of system 100a is the same as that of system 100b, such operation will not be described in detail herein.

It will furthermore be obvious that thermal energy can be stored in the storage units 106a and 106b of both systems when available and recovered later from the units operating simultaneously or in sequence when a demand arises. This mode of operation can be used to particular advantage to increase the efficiency of conventional power plants by storing excess energy during off-peak periods and then making it available when the demand for heat and/or cooling coincides with periods of peak demand.

The sequencing of the various valves in system 98 will typically be accomplished by an automatic sequencing controller. As such controllers are commerically available on a widespread basis and as the details of the controller do not constitute part of the present invention, this controller will not be discribed herein.

Among the other advantages of the system 98 just described is its compactness. A system for an average single family residence and employing magnesium-based alloys in input-output tanks 102a and 102b with modified iron-titanium alloys in storage tanks 106a and 106b would only require cube-shaped tanks 102a and 102b with a dimension of 1.4 feet and tanks 106a and 106b 2.2 feet long.

For the sake of convenience the principles of our invention have been developed above primarily by relating them to applications involving space heating and air conditioning. This approach, however, is not to be taken as implying any limitation on the scope of the protection to which we consider ourselves entitled as there are other purposes for which our invention can equally well be used. For example, the hot air generated on the dehydriding cycle of the systems described above can be expanded through the gas turbine of a turbine-generator set to produce electricity. And still other applications of our invention were mentioned above and will be readily apparent to those conversant with the technical fields to which our invention pertains. Consequently, to the extent that they are not expressly excluded from the appended claims, all applications, uses, and adaptations of our invention are fully intended to be covered therein.

The invention may also be embodied in forms other than those described above without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Thermal energy utilization apparatus comprising:
   (a) an input-output tank containing a first hydride former and a storage tank containing a second hydride former, the first hydride former being an intermetallic compound or alloy having the nominal formula, by atomic ratio, of: $Mg_{0.8-0.9}Ni_{0-0.1}M_{0-0.1}$ where M is an element from periodic table groups I-B, III-A, or IV-A or a mixture thereof and the second hydride former being an intermetallic compound or alloy having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof;
   (b) flow means communicating between and with the interiors of the input-output tank and the storage tank;
   (c) means for heating said first hydride former to liberate hydrogen therefrom and effect a flow of said hydrogen from said input-output tank through said flow means to said storage tank;
   (d) means for removing heat from said second hydride former to effect the association of said hydrogen therewith;
   (e) means for heating the second hydride former to effect a dissociation of hydrogen therefrom, a flow of said hydrogen from said storage tank to said input-output tank, and an exothermic, heat producing association of said hydrogen with the hydride former in said input-output tank; and
   (f) means for recovering and utilizing heat liberated by the association of the hydrogen with the first hydride former.

2. Thermal energy utilization apparatus comprising:

(a) an input-output tank containing a first hydride former and a storage tank containing a second hydride former, the first and second hydride formers both being intermetallic compounds or alloys having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof;

(b) flow means communicating between and with the interiors of the input-output tank and the storage tank;

(c) means for heating said first hydride former to liberate hydrogen therefrom and effect a flow of said hydrogen from said input-output tank through said flow means to said storage tank;

(d) means for removing heat from said second hydride former to effect the association of said hydrogen therewith;

(e) means for heating the second hydride former to effect a dissociation of hydrogen therefrom, a flow of said hydrogen from said storage tank to said input-output tank, and an exothermic, heat producing association of said hydrogen with the hydride former in said input-output tank; and (f) means for recovering and utilizing heat liberated by the association of the hydrogen with the first hydride former.

3. Thermal energy utilization apparatus comprising:
(a) an input-output tank containing a first hydride former and a storage tank containing a second hydride former;

(b) flow means communicating between and with the interiors of the input-output tank and the storage tank;

(c) means for heating said first hydride former to liberate hydrogen therefrom and effect a flow of said hydrogen from said input-output tank through said flow means to said storage tank;

(d) means for circulating a fluid into heat transfer relationship with said second hydride former to remove heat from and effect the association therewith of the hydrogen flowing to said storage tank;

(e) means for employing the reduced temperature fluid as a cooling medium for refrigeration and/or space air conditioning;

(f) means for heating the second hydride former to effect a dissociation of hydrogen therefrom, a flow of said hydrogen from said storage tank to said input-output tank, and an exothermic, heat producing association of said hydrogen with the hydride former in said input-output tank; and (g) means for recovering and utilizing heat liberated by the association of the hydrogen with the first hydride former.

4. Thermal energy utilization apparatus comprising:
(a) an input-output tank containing a first hydride former and a storage tank containing a second hydride former;

(b) flow means communicating between and with the interiors of the input-output tank and the storage tank;

(c) means for heating said first hydride former to liberate hydrogen therefrom and effect a flow of said hydrogen from said input-output tank through said flow means to said storage tank;

(d) means for removing heat from said second hydride former to effect the association of said hydrogen therewith;

(e) means for heating the second hydride former to effect a dissociation of hydrogen therefrom, a flow of said hydrogen from said storage tank to said input-output tank, and an exothermic, heat producing association of said hydrogen with the hydride former in said input-output tank; and (f) means for recovering heat liberated by the association of the hydrogen with the first hydride former comprising a first heat exchanger surrounded by said first hydride former, a second heat exchanger, conduits connecting the first and second heat exchangers into a closed circulation system, means for circulating a first heat exchange fluid through said closed circulation system to transfer said heat of association to said first fluid, and means for circulating a second heat transfer fluid into heat transfer relationship with the first fluid circulating through said second heat exchanger to thereby transfer said heat to said second fluid.

5. Thermal energy utilization apparatus comprising:
(a) an input-output tank containing a first hydride former and a storage tank containing a second hydride former;

(b) flow means communicating between and with the interiors of the input-output tank and the storage tank;

(c) means for heating said first hydride former to liberate hydrogen therefrom and effect a flow of said hydrogen from said input-output tank through said flow means to said storage tank;

(d) means for removing heat from said second hydride former to effect the association of said hydrogen therewith;

(e) means for heating the second hydride former to effect a dissociation of hydrogen therefrom, a flow of said hydrogen from said storage tank to said input-output tank, and an exothermic, heat producing association of said hydrogen with the hydride former in said input-output tank; and p1 (f) means for recovering heat liberated by the association of the hydrogen with the first hydride former, said first hydride former being encased in a matrix means located in said input-output tank and having flow passages therethrough and the means for recovering heat of association comprising means for circulating a heat transfer fluid through the passages in said matrix means.

6. A method of utilizing energy which comprises the steps of: effecting a flow of hydrogen into contact with a hydridable metallic material having the nominal formula, by atomic ratio, of $Mg_{0.8-0.9}Ni_{0-0.1}M_{0-0.1}$ where M is an element from periodic table groups I-B, III-A, or IV-A or a mixture thereof or the nominal formula, by atomic ratio, of: $Fe_{0.1-1.0}Ti_{1.0}N_{0-0.9}$ where N is an element from periodic table groups IV-B, V-B, VII-B, or VIII or a mixture thereof to form a hydride by the association of said hydrogen and said metallic material; circulating a fluid heat transfer medium into heat transfer relationship with the hydrided metallic material to desorb hydrogen therefrom while concomitantly cooling said fluid; and thereafter utilizing said fluid as a cooling medium for refrigeration and/or space air conditioning.

7. A method of utilizing energy as claimed in claim 6 in which the desorbing of the hydrogen is effected continuously.

8. A method of utilizing energy as claimed in claim 6 in which the metallic material is first hydrided as aforesaid and then subsequently dehydrided to provide a cooling medium as aforesaid when a demand arises.

9. Thermal energy utilization apparatus comprising:
(a) an input-output tank containing a first hydride former and a storage tank containing a second hydride former,
(b) flow means communicating between and with the interiors of the input-output tank and the storage tank,
(c) means for heating said first hydride former to liberate hydrogen therefrom and effect a flow of said hydrogen from said input-output tank through said flow means to said storage tank;
(d) means for circulating a fluid into heat transfer relationship with said second hydride former to remove heat therefrom and thereby promote the association of hydrogen therewith;
(e) means for heating the second hydride former by circulating a fluid into heat transfer relationship therewith to effect a dissociation of hydrogen therefrom with a concurrent reduction in the temperature of said fluid, a flow of said hydrogen from said storage tank to said input-output tank and an exothermic, heat producing association of said hydrogen with the first hydride former in said input-output tank; and
(f) means for utilizing the fluid circulated into heat transfer relationship with said second hydride former to effect a dissociation of hydrogen therefrom as a cooling medium for refrigeration and/or space air conditioning.

10. A thermal energy utilization system as claimed in claim 9 together with means for recovering and utilizing heat liberated by the association of the hydrogen with the first hydride former.

11. Thermal energy utilization apparatus comprising: a tank containing a hydridable metallic material which is an intermetallic compound or alloy having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof; means for circulating a fluid into heat transfer relationship with said hydridable metallic material to heat, and effect a dissociation of hydrogen from, said hydridable material with a concurrent reduction in the temperature of the fluid; and means for employing the reduced temperature fluid as a cooling medium for refrigeration and/or space air conditioning.

12. In combination:
I. first and second thermal energy utilization apparatuses each including:
(a) an input-output tank containing a first hydride former and a storage tank containing a second hydride former;
(b) flow means communicating between and with the interiors of the input-output tank and the storage tank;
(c) means for circulating a first fluid into heat transfer relationship with said first hydride former to liberate hydrogen therefrom and effect a flow of said hydrogen from said input-output tank through said flow means to said storage tank;
(d) means for concomitantly circulating a second heat transfer fluid into heat transfer relationship with said second hydride former to promote the association of hydrogen therewith and to heat said second fluid;
(e) means for thereafter utilizing said second fluid as a heating medium;
(f) means for circulating second fluid as aforesaid or a third fluid into heat transfer relationship with said second hydride former to effect a dissociation of hydrogen therefrom, a flow of said hydrogen from said storage tank through said flow means to said input-output tank, and an exothermic, heat producing association of the hydrogen with the first hydride former therein;
(g) means for concomitantly circulating first fluid as aforesaid into heat transfer relationship with said first hydride former to heat said first fluid;
(h) means for thereafter utilizing the heated first fluid as a heating medium; and
II. control means for so regulating the operation of said first and second thermal energy utilization apparatuses as to concomitantly make said first fluid available as a cooling medium from one of said apparatuses and said second or third fluid available as a heating medium from the other of said apparatuses or vice versa.

13. In combination:
I. first and second thermal energy utilization apparatuses each of which includes:
(a) an input-output tank containing a first hydride former and a storage tank containing a second hydride former;
(b) flow means communicating between and with the interiors of the input-output tank and the storage tank;
(c) means for circulating a first fluid into heat transfer relationship with said first hydride former to liberate hydrogen therefrom and effect a flow of said hydrogen from said input-output tank through said flow means to said storage tank;
(d) means for concomitantly circulating a second heat transfer fluid into heat transfer relationship with said second hydride former to promote the association of hydrogen therewith and to heat said second fluid;
(e) means for thereafter utilizing said second fluid as a heating medium;
(f) means for circulating second fluid as aforesaid or a third fluid into heat transfer relationship with said second hydride former to effect a dissociation of hydrogen therefrom, a flow of said hydrogen from said storage tank through said flow means to said input-output tank, and an exothermic, heat producing association of the hydrogen with the first hydride former therein;
(g) means for concomitantly circulating a first fluid as aforesaid into heat transfer relationship with said first hydride former to heat said first fluid;
(h) means for thereafter utilizing the heated first fluid as a heating medium; and
II. control means for so regulating the operation of said first and second thermal energy utilization apparatuses as to effect an association of hydrogen with the second hydride former in one of said apparatuses to thereby store thermal energy therein and concomitantly effect a dissociation of hydrogen from the second hydride former in the other of said apparatuses to thereby make cooling fluid available for refrigeration and/or space air conditioning.

14. Thermal energy utilization apparatus comprising:
(a) an input-output tank containing a first hydride former and a storage tank containing a second hydride former, the first hydride former being an intermetallic compound or alloy having the nominal formula, by atomic ratio, of: $Mg_{0.8-0.9}Ni_{0-0.1}M_{0-0.1}$ where M is an element from periodic table groups I-B, III-A, or IV-A or a mixture thereof and the second hydride former being an intermetallic compound or alloy having the nominal formula by atomic ratio, of: $Fe_{0.1-1.0}Ti_{1.0}N_{0-0.9}$ where N is an element from periodic table groups IV-B, V-B, VI-B, VII-B, or VIII or a mixture thereof;

(b) flow means communicating between and with the interiors of the input-output tank and the storage tank;

(c) means for circulating a first fluid into heat transfer relationship with said first hydride former to liberate hydrogen therefrom and effect a flow of said hydrogen from said input-output tank through said flow means to said storage tank; means for concomitantly circulating a second heat transfer fluid into heat transfer relationship with said second hydride former to promote the association of hydrogen therewith and to heat said second fluid; means for thereafter utilizing said second fluid as a heating medium; means for circulating second fluid as aforesaid or a third fluid into heat transfer relationship with said second hydride former to effect a dissociation of hydrogen therefrom, a flow of said hydrogen from said storage tank through said flow means to said input-output tank, and an exothermic, heat producing association of the hydrogen therewith; means for concomitantly circulating first fluid as aforesaid into heat transfer relationship with said first hydride former to heat said first fluid; and means for thereafter utilizing the heated first fluid as a heating medium.

15. Thermal energy utilization apparatus comprising:
(a) an input-output tank containing a first hydride former and a storage tank containing a second hydride former, both of said hydride formers being intermetallic compounds or alloys having the nominal formula, by atomic ratio, of: $Fe_{0.1-1.0}Ti_{1.0}N_{0-0.9}$ where N is an element from periodic table groups IV-B, V-B, VI-B, VII-B, or VIII or a mixture thereof;

(b) flow means communicating between and with the interiors of the input-output tank and the storage tank;

(c) means for circulating a first fluid into heat transfer relationship with said first hydride former to liberate hydrogen therefrom and effect a flow of said hydrogen from said input-output tank through said flow means to said storage tank; means for concomitantly circulating a second heat transfer fluid into heat transfer relationship with said second hydride former to promote the association of hydrogen therewith and to heat said second fluid; means for thereafter utilizing said second fluid as a heating medium; means for circulating second fluid as aforesaid or a third fluid into heat transfer relationship with said second hydride former to effect a dissociation of hydrogen therefrom, a flow of hydrogen from said storage tank through said flow means to said input-output tank, and an exothermic, heat producing association of the hydrogen therewith; means for concomitantly circulating first fluid as aforesaid into heat transfer relationship with said first hydride former to heat said first fluid; and means for thereafter utilizing the heated first fluid as a heating medium.

16. A method of utilizing thermal energy which comprises the steps of: storing said energy in the form of a metallic hydride by associating it with a first metallic hydride former which is an intermetallic compound or alloy having the nominal formula, by atomic ratio, of: $Mg_{0.8-0.9}Ni_{0-0.1}M_{0-0.1}$ where M is an element from periodic table groups I-B, III-A, or IV-A or a mixture thereof and subsequently recovering and making said energy available by disassociating said hydride, effecting a flow of the hydrogen thereby liberated to and associating said hydrogen with a second metallic hydride former which is an intermetallic compound or alloy having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof, and circulating a heat transfer fluid into heat transfer relationship with said second hydride former to effect a transfer of heat to said fluid.

17. A method of utilizing energy as claimed in claim 16 in which said energy has a temperature of about 200° C. or higher.

18. A method of utilizing thermal energy which comprises the steps of: storing said energy in the form of a metallic hydride by associating it with a first metallic hydride former which is an intermetallic compound or alloy having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof and subsequently recovering and making said energy available by dissociating said hydride, effecting a flow of the hydrogen thereby liberated to and associating said hydrogen with a second metallic hydride former which is also an intermetallic compound or alloy having the nominal formula, by atomic ratio, of: $Fe_{0.1-1.0}Ti_{1.0}N_{0-0.9}$ where N is an element from periodic table groups IV-B, V-B, VI-B, VII-B or VIII or a mixture thereof, and circulating a heat transfer fluid into heat transfer relationship with said second hydride former to effect a transfer of heat to said fluid.

19. A method of utilizing energy as claimed in claim 18 in which said energy has a temperature of about 60° C. or lower.

20. A method of utilizing thermal energy which comprises the steps of: storing said energy in the form of a first metallic hydride by associating it with a first metallic hydride former; subsequently making said energy available by dissociating said first hydride and effecting a flow of the hydrogen thereby liberated to and associating said hydrogen with a second metallic hydride former, said step of dissociating said first hydride being carried out by circulating a first heat transfer fluid into heat transfer relationship with said first metallic hydride to increase the temperature of the first hydride and to decrease the temperature of the first fluid and thereby make it available as a cooling medium, and the step of associating hydrogen with said second hydride former being carried out by circulating a second heat transfer fluid into heat transfer relationship therewith said second hydride former to decrease the temperature of said second hydride former and to increase the temperature of said second heat transfer fluid, thereby making it available as a heating medium; the dissociation of hydrogen from the first hydride former and the cooling of the first heat transfer fluid being effected at the same time as the association of hydrogen with the second hydride former and the heating of the second heat transfer fluid, thereby making said second and first heat transfer fluids concomitantly available for heating and cooling purposes.

* * * * *